United States Patent [19]

Attali et al.

[11] Patent Number: 4,814,610
[45] Date of Patent: Mar. 21, 1989

[54] METHOD FOR MORE ACCURATELY DETERMINING THERMAL NEUTRON DECAY TIME CONSTANTS

[75] Inventors: George Attali, Houston; Bruce T. Murdoch, Spring, both of Tex.

[73] Assignee: Western Atlas International, Inc., Houston, Tex.

[21] Appl. No.: 4,161

[22] Filed: Jan. 15, 1987

[51] Int. Cl.$^4$ .............................................. G01V 5/10
[52] U.S. Cl. .................................... 250/269; 250/270; 250/256
[58] Field of Search ................. 250/270, 262, 269, 256

[56] References Cited

U.S. PATENT DOCUMENTS

| | | | |
|---|---|---|---|
| 3,358,142 | 12/1967 | Hopkinson et al. | 250/262 |
| 3,379,882 | 4/1968 | Youmans | 250/270 |
| 3,379,884 | 4/1968 | Youmans | 250/262 |
| 3,566,116 | 2/1971 | Nelligan | 250/262 |
| 3,800,150 | 3/1974 | Givens | 250/270 |
| 4,292,518 | 9/1981 | Johnstone | 250/262 |
| 4,316,086 | 2/1982 | Hopkinson | 250/262 |
| 4,327,290 | 4/1982 | Plasek | 250/270 |
| 4,388,529 | 6/1983 | Peelman | 250/270 |
| 4,390,783 | 6/1983 | Grau | 250/270 |
| 4,409,481 | 10/1983 | Smith, Jr. et al. | 250/270 |
| 4,424,444 | 1/1984 | Smith, Jr. et al. | 250/262 |
| 4,600,838 | 7/1986 | Steinman et al. | 250/270 |

FOREIGN PATENT DOCUMENTS 0194027  3/1910  European Pat. Off. .

OTHER PUBLICATIONS

"A New Digital Multiscale Pulsed Neutron Logging System" by R. R. Randall et al., SPE Paper No. 14461 presented Sep. 22–25, 1985 at 60th Annual Technical Conference and Exhibition, Society of Petroleum Engineers, Las Vegas, Nevada.

Primary Examiner—Janice A. Howell
Assistant Examiner—William F. Rauchholz
Attorney, Agent, or Firm—Browning, Bushman, Zamecki and Anderson

[57] ABSTRACT

The present invention comprises a method for determining the transition point between a portion of a curve comprising a statistically single exponential function and another portion of the curve comprising the composite of said exponential function with another function. The method of the present invention is useful in determining which portion of a composite decay curve is statistically equivalent to a single exponential function. The method of the present invention is particularly useful in the oil and gas industry in connection with the rapid and accurate determination of the decay constant of the formation surrounding a borehole. In the method of the present invention, the measured decay function following radiation of the formation with a burst of fast neutrons is integrated in a plurality of contiguous time gates between the end of the neutron burst and the decay to background radiation levels. The decay function is integrated over each of two subsets of contiguous gates whose leading edges are offset by a known time width. A succession of ratios is constructed for a succession of test intervals each defined by two such subsets. Ratios for different test intervals, each successively further in time from the end of the radiation burst, are statistically compared. Statistical compatibility of two successive ratios implies that the decay function is a statistically single exponential over the time spanned by the two test intervals. Once the portion of the decay curve represented by a statistically single exponential function representative of the surrounding formation is determined, the formation decay constant is easily and accurately determined.

20 Claims, 4 Drawing Sheets

METHOD FOR MORE ACCURATELY DETERMINING THERMAL NEUTRON DECAY TIME CONSTANTS

BACKGROUND OF THE INVENTION

1. Field of the Invention

The present invention generally relates to a method for determining the transition zone on a curve between a statistically single exponential function and a composite function of the single exponential and another function. The present invention is particularly useful as it relates to an improved method for accurately determining the thermal neutron decay time constant in a geological formation surrounding a well bore.

2. Description of the Background

Thermal neutron logging of oil and gas wells is an established technique for analysing the subsurface structure and fluid content of geological formations. A downhole instrument containing a pulsed neutron source and two radiation detectors at different spacings from the source is employed in thermal neutron logging techniques. After the logging apparatus is lowered into a borehole, the electrically powered neutron source is activated to provide periodic short bursts of fast neutron radiation. The fast neutrons lose energy and are quickly slowed to thermal velocities by repeated collisions with the nuclei of atoms in the environment, including both the borehole and the surrounding geological formation. However, because the absorption cross section for high energy neutrons is low, most of the emitted high energy neutrons pass through the borehole fluid, casing and cement to interact with the surrounding geological material. Because the cross section for neutron absorption is typically higher for slow or thermal neutrons than for fast neutrons, the low energy, thermal neutrons produced in the surrounding geological formation are more likely to be absorbed.

The absorption of a thermal neutron by a nucleus is often accompanied by subsequent emission of gamma radiation at an energy characteristic of the absorbing element. These reactions are known as neutron-gamma capture reactions. These capture gamma rays may be detected as an indication of the occurrence of the neutron-gamma capture reaction. After the neutron source is turned off, the count rates in the radiation detectors are monitored as a function of time. Detectors directly sensitive to the presence of thermal neutrons may be employed. However, detectors sensitive to the presence of capture gamma radiation, e.g., sodium iodide or cesium iodide scintillation detectors, are more commonly employed.

The low energy, thermal neutrons are particularly likely to participate in nuclear reactions with any of several elements commonly present in the formation. For example, the element chlorine, a common constituent of subterranean waters, has one of the highest cross sections or probabilities for thermal neutron capture with resultant gamma ray emission. Due to the high cross section of chlorine for the capture of thermal neutrons, the rate at which thermal neutrons disappear from the immediate environment of the logging instrument is largely dependent on the concentration of chlorine in the borehole and formation fluids. Because both liquid and gaseous petroleum fluids contain virtually no chlorine, formation petroleum fluids easily may be distinguished from saline fluids by measuring the rate at which capture gamma radiation declines after a neutron source is turned off. As a result of the high cross section of chlorine, the rate of decline is typically much faster in formations bearing saline water than the rate in formations bearing petroleum products.

However, actual borehole decay rates are also dependent on the composition of the surrounding formation and the drilling fluids in addition to the composition of the formation fluids. The rate of radiation time decay is dependent on the total nuclear composition of the environment, of which chlorine comprises only one element. Accordingly, a measurement of the time decay rate provides diagnostic information about the well bore environment in general. The probability of absorption of thermal neutrons in each element is known. Thus, the probability of absorption in each material comprising the environment may be estimated. For example, the probability of absorption in sandstone is different from that of absorption in limestone. Such differences will affect the average time decay measurement. However, with prior knowledge of lithology and porosity, the measured time decay rate may be interpreted to estimate the quantity of water and petroleum in a geological formation. This knowledge is of great importance in the analysis of the economics of petroleum production.

Although the basic time decay measurements may be obtained using only one radiation detector, it has become customary to utilize two separate detectors at different distances from the neutron source, so that the two counting rates may be analyzed and compared. These comparisons permit analysis of the extent of certain errors resulting from the diffusion of neutrons in the formation at the borehole wall. This comparison also permits corrections for the effects of the borehole diameter and for fluid salinity to be calculated and applied. Further, when the detectors are spaced near and far from the neutron source, comparison of the total counting rates yields information about the porosity of the fluid filled pore spaces in the formation.

For a true exponential decay process, the exponential decay law $$N(t) = N_0 exp(-t/\tau)$$

states that a measured detector count rate $N(t)$ will be observed at time t following the end of a neutron burst, where $N_0$ is the count rate immediately following the neutron burst and $\tau$ is the exponential time constant characteristic of the formation. The time constant is related to the total macroscopic thermal neutron capture cross section by the relation $$\tau(microseconds) = 4550/\Sigma \text{ (capture units)}$$

where $\Sigma$ is the sum of the cross sections of the individual elements in the formation. Experience has established that the exponential decay time constant in typical petroleum formations ranges from approximately 70 microseconds to 1000 microseconds.

Although the theoretical thermal neutron decay curve approximates a perfect exponential, the initial decay observed for actual curves is influenced by effects associated with the well bore. In actual thermal neutron decay curves, the first portion of the decay curve is generally a composite of two or more decay curves. The earliest portion is most influenced by the well bore effects and the later portion more clearly resembles the exponential decay representative of the true neutron decay in the formation. With the passage of sufficient time after each neutron burst, the well bore effects diminish and the thermal neutron decay curve more closely approximates a true, single exponential decay function.

As the population of thermal neutrons continues to decrease exponentially, eventually a point is reached at which the rate of decay of the thermal neutron population is no longer significant compared to background effects. Measurement of the thermal neutron decay time constant must be made during the time between the end of the high energy neutron burst, actually after the initial decay period influenced by the well bore effects has passed, and the time at which the thermal neutron population has decayed to an approximately constant background level. The background counting rate from the detectors must also be determined and subtracted from the measured counting rates to produce a true exponential decay curve corrected for background.

Many methods and devices have been employed to acquire and analyze data representing the radiation time history following a burst of fast neutron radiation in geological formations. Generally, data is acquired in the form of integrated count rates taken during two or more specific intervals following each radiation burst. For example, two fixed time windows have been employed to obtain such data. Exemplary patents disclosing methods and apparatus used in these systems include U.S. Pat. Nos. 3,358,142 issued to Hopkinson and 3,379,884 and 3,379,882 issued to Youmans.

Another approach known as the "normalized sliding gate" technique employs three time gates for data acquisition, wherein the widths and placements of the time gates bear specific relationships to the measured decay constant. This technique is described in U.S. Pat. No. 3,566,116 issued to Nelligan which is incorporated herein by reference for all purposes. In this technique disclosed by Nelligan, the acquisition time gates are positioned so that the background corrected count rate ratio from the first two gates is equal to a predetermined fixed value. The background corrections are obtained from the third gate. The exponential decay constant is deduced from the gate placement required to achieve the desired count rate ratio of the first two gates. The neutron burst repetition rate is adjusted to be more or less frequent as appropriate to the most recent measurement. This technique makes the assumption that the measured time decay function being sampled is a true exponential, which is not always true for measurements made shortly after the neutron burst.

Still another approach involves sampling count rate data in six intervals of fixed but unequal time widths at predetermined and invariant fixed times following the neutron blast. This approach is exemplified in U.S. Pat. Nos. 4,388,529 issued to Peelman 4,409,481 and 4,424,444 issued to Smith. In this approach, the time integrated radiation detection counts from the six windows are processed with a least squares iterative fitting algorithm. The fitting algorithm finds a "best fit" of the measured decay function to a mathematical function consisting of the sum of two separate exponentials and a constant background level. The purpose of the fitting method is to extract not only a slope representative of the formation decay constant, but also, to extract a second time decay slope representing contributions from the decay of the thermal neutron population in the borehole region. In this method, the neutron burst repetition rate and gate placements remain constant and fixed under all measurement conditions.

The most recently disclosed method involves placement of one hundred time analysis acquisition intervals of equal width both during and after the fixed repetition rate neutron burst. This method was disclosed by R. R. Randall in SPE Paper No. 14461 presented in 1985. A single window time averaging time analysis technique is performed on a portion of the data points in order to extract a formation decay constant. The decay function is not tested for exponentiality, but again is assumed to be an exponential decay function in order to make the computation.

The above prior methods for determining the decay constant suffer from several drawbacks. For example, the analysis time gates may not always be optimally placed to produce the best statistics and/or the most accurate measurements. Additionally, the decay function sampled is not always a true exponential, particularly as a result of the borehole effects, and the analysis method may be inappropriate and inaccurate as a result. In these methods, the decay function is not explicitly tested to determine if it may be approximated by an exponential time decay function. Finally, the sum of statistical and systematic errors in the computation may be larger than necessary due either to inadequate sampling intervals which neglect some usable data or to fitting uncertainties which arise when iterative fitting techniques are used.

The present invention overcomes many of the above problems and provides an improved method for accurately determining the thermal neutron decay constant of an unknown material and for testing to ensure that the decay function is a true exponential. An exemplary use of the present invention is to provide an improved method for accurately determining the thermal neutron decay time constant in a geological formation surrounding a well bore.

SUMMARY OF THE INVENTION

The present invention is directed to a method for determining the transition point between a second portion of a curve comprising a statistically single exponential function and a first portion of the curve comprising the composite of said exponential function with another function. The method of the present invention is useful in determining the portion of a composite decay function comprised of a statistically single exponential decay function.

The method of the present invention is particularly useful in the oil and gas industry in connection with the rapid and accurate determination of the decay constant of the formation surrounding a borehole. The formation surrounding a cased or uncased borehole is irradiated with a plurality of consecutive bursts of fast neutrons from a source disposed on a logging sonde. These fast neutrons are slowed to thermal velocities and enter into neutron capture reactions with atoms in the surrounding formation. The thermal neutron concentrations during each of a plurality of discrete time intervals following each neutron burst are determined, typically by measuring the capture gamma rays emitted from the neutron capture reactions.

These measurements are employed to produce a decay curve, integration of which permits calculation of the decay constant for the formation. The initial portion of this decay curve is a composite curve comprised of the sum of the decay curves for the borehole region and for the formation. Following a transition zone, a central portion of the decay curve approximates the true decay curve for the surrounding formation. The latter portions of the decay curve approximate the background radiation level. In order to maximize the statistical accuracy of the calculated decay constant, it is desirable to use that portion of the decay curve which most closely represents a statistically single exponential decay function of the formation and which is comprised of the earliest portions of said curve to take advantage of the highest count rates. Accordingly, it is desirable to determine the transition zone between the early composite decay function representative of the combined borehole and formation and the later, statistically single exponential decay function representative of the formation.

It has been found that the transition zone may be determined by examination of a plurality of ratios which are a function of the decay constant and several other variables, all of which are easily determined. The thermal neutron population is determined by measuring the radiation count rate in a plurality of gates corresponding to discrete time intervals between the end of the neutron burst and the decay to background levels. The count rates in each of two subsets of such gates, each comprised of a plurality of contiguous gates whose leading edges are offset by a discrete time width, are determined. The time width spanned by these combined gate subsets comprises a test interval in which a ratio is determined, the numerator and denominator of which are related to the earlier and later subsets of gates, respectively. Comparison of such ratios for test intervals, each of which is successively further removed from the end of the neutron burst, permits the transition zone of the measured decay curve to be precisely located. It may be assumed that the portion of the decay curve represented by two successive test intervals whose ratios are statistically compatible is a statistically single exponential representative of the decay function of the surrounding formation. Once this portion of the decay curve is determined, the decay constant of the formation is easily and accurately determinable.

The specific embodiment described herein demonstrates how a sequence of statistical tests performed on certain numerical ratios indicates which portion of a measured radiation decay curve is statistically compatible with a single exponential function. This analytical approach offers, among others, the following advantages: the calculation is straightforward and fast, with no iteration, making it suitable to real-time use; the single exponentiality of all or a portion of the measured decay function is rigorously verified before further analysis is performed; the calculation of the formation decay constant is performed without influence of or perturbation by the borehole contribution. Compared to alternative earlier techniques, fluctuations due to fitting uncertainties on multiple parameters are avoided; and the largest portion of the data which can contribute significantly to the calculation of the formation decay constant is utilized.

This method permits the neutron decay time constant of the formation and fluids surrounding a borehole to be more accurately determined. This method is useful with a wider range of borehole fluid salinities than previous methods. These and other meritorious features and advantages of the present invention will be more fully appreciated from the following detailed description and claims.

BRIEF DESCRIPTION OF THE DRAWINGS

Other features and intended advantages of the present invention will be more readily apparent by the references to the following detailed description in connection with the accompanying drawings, wherein.

Figure 1:
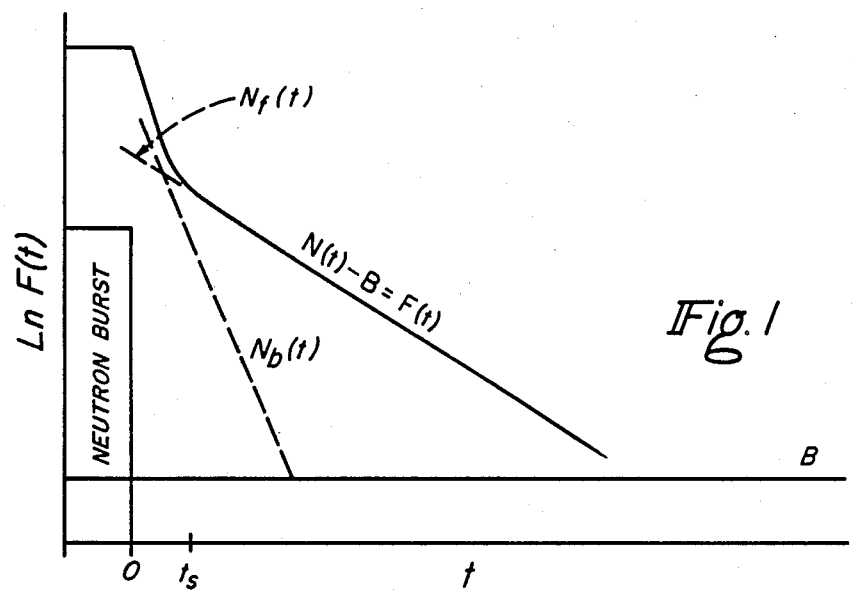
FIG. 1 is a graphical representation illustrating an observed borehole decay curve showing the components of the curve contributed by the background, the borehole effect and the true formation decay curve.

While the invention will be described in connection with the presently preferred embodiment, it will be understood that it is not intended to limit the invention to this embodiment. On the contrary, it is intended to cover all alternatives, modifications and equivalents as may be included in the spirit of the invention as defined in the appended claims.

DETAILED DESCRIPTION OF THE PREFERRED EMBODIMENT

1. Introduction

The present invention generally relates to a method for determining the transition zone on a curve between a statistically single exponential function and a composite function of the single exponential and another function. The present invention may be employed in an improved analytical method for determining thermal neutron decay time constants. The method is particularly applicable in the oil and gas drilling industry to determine the thermal neutron decay time constants of geological media measured from within boreholes cased with cemented, steel production tubing.

Apparatus for producing repetitive timed bursts of fast neutron radiation and for detecting the resultant stimulated thermal neutron or capture gamma radiation are well known. Exemplary apparatus are described in the patents which are discussed in the background of the invention and which are incorporated herein by reference. For example, the apparatus described in the Randall paper or similar data acquisition systems may be employed to perform the method of the present invention with little or no modification. The methods by which the detector count rate data are sampled over time and are accumulated for analysis in those patents may be modified to be appropriate to the analytical method of the present invention. Specifically, the time analysis acquisition intervals or gates must be sufficiently numerous and must cover an adequate contiguous total time span for the method of the present invention to be effective. Accordingly, particular apparatus or data acquisition methods discussed in the background may need to be modified to achieve these requirements. However, such modifications are clearly within the ability of those skilled in the art.

A principal advantage of the analytical technique of the present invention is that it permits the user to test the statistically single exponentiality of the radiation decay function prior to each calculation of formation decay constant. This capability permits the user to select for analysis only that portion of the decay function which is statistically equivalent to a single exponential decay function. Application of this technique minimizes errors due to borehole contributions to the measurement and improves the statistical precision of the calculated formation decay constant. As a result, an accurate and precise formation decay constant is easily and quickly calculated from the portion of the measured decay function which may be represented by a statistically single exponential function. This simple calculation is advantageous by not requiring the use of the complex, iterative least squares functional fitting routines of some prior methods.

2. General Mathematical Basis

The analytical method of the present invention involves the separation of a curve into a portion which is represented by a statistically single exponential function and a portion which is represented by a composite function of the single exponential and another function by means of a series of ratio tests described in detail below. In the application to the oil and gas industry, the measured time decay function is separated into the borehole contribution and a single exponential function representative of the true formation decay curve. The portion of the time decay function which is found to be statistically compatible with a single exponential function, after correction for residual background radiation, is then analyzed in a straightforward fashion in order to extract the formation decay constant. The method of the present invention offers the advantages of mathematical simplicity, maximized accuracy and statistical precision compared to prior methods.

Typically, the measurement apparatus includes a pulsed neutron generator for irradiating a formation with repetitive bursts of fast neutrons from within a borehole in the formation. The borehole is usually cased with steel pipe which is secured with cement. Conventional scintillation detectors which respond to gamma rays emanating from the surrounding environment, including the borehole and the formation, are disposed at one or more locations along the axis of the tool from the neutron source.

Within the practical limits of measurement statistics, the radiation decay function following each fast neutron burst will be equal to a compound time function made up of three components: a constant background, a single exponential decay of borehole components, and single exponential decay of formation components. Such a function and its components are illustrated in FIG. 1. The counting rate N(t) at time t observed with one such scintillation detector is expressed as follows:

$$N(t) <=> N_b(O) e^{-t/\tau_b} + N_f(O) e^{-t/\tau_f} + B \qquad (1)$$

where
t = time lapsed from end of neutron burst $N_b(O)$ = initial counting rate from borehole environment
$N_f(O)$ = initial counting rate from formation environment
$\tau_b$ = borehole decay time constant
$\tau_f$ = formation decay time constant
B = background counting rate, and
<=> indicates statistical equivalence Equation (1) does not include longer term effects due to thermal neutron diffusion and background buildup. This simplification is possible due to the statistical nature of the measurement. In practical measuring configurations, the statistics are limited by available neutron source strength, detector efficiencies and measurement acquisition times. The statistical precision available in realistic well-logging applications with present state-of-the-art apparatus precludes valid detection of more detailed fine structure in the decay function N(t). The five parameters $N_b(O)$, $\tau_b$, $N_f(O)$, $\tau_f$, and B adequately describe any decay function acquired by state-of-the-art pulsed neutron logging apparatus.

An important analytical simplification is made possible by the fact that the borehole contribution to induced gamma radiation is generally short-lived compared to the formation contribution. See FIG. 1. The borehole environment typically includes materials with high thermal neutron capture cross sections, e.g., steel and saline drilling fluids. There is in practice a transition time $t_s$ measured after the end of the most recent neutron radiation burst beyond which the background-corrected decay function $F(t) = N(t) - B$ is statistically indistinguishable from a single exponential function attributable to the formation.

$$F(t) <=> N_f(O) e^{-t/\tau_f} \qquad (2)$$

where $t > t_s$.

Some present techniques have established either fixed or $\tau_f$ normalized values for the transition time $t_s$ beyond which simplified analyses for formation decay constant are performed. However, $t_s$ values selected in these ways are often inappropriate. Values of $t_s$ which are too short result in significant borehole contribution to the portion of the function assumed to be a single exponential, resulting in erroneous decay function calculation. On the other hand, unnecessarily long $t_s$ values result in poor calculation statistics due to ignoring significant early portions of the measured decay function. In the first case, $\tau_f$ will be distorted by borehole contribution, while in the second case statistical precision is sacrificed. The principal purpose of the present analytical technique is to find the transition time $t_s$ in order to provide improved accuracy in the determination of $\tau_f$ by minimizing the borehole contribution and maximizing the statistical precision of the calculations.

Typical apparatus for acquisition of detector countrate data comprises a neutron source and one or more scintillation detectors with conventional data acquisition, storage and processing means including a series of time-gated acquisition intervals or gates during which individual detection pulses are summed. The gates are timed relative to the end of each neutron burst and are of fixed time width. The gates may be of various widths but preferably are of equal width. Data are generally summed over a large number of burst acquisition cycles in order to build up a useful statistical base. Summing of detector pulses during each gate is mathematically equivalent to the integration of a time-decay function over the same time interval.

Figure 2:
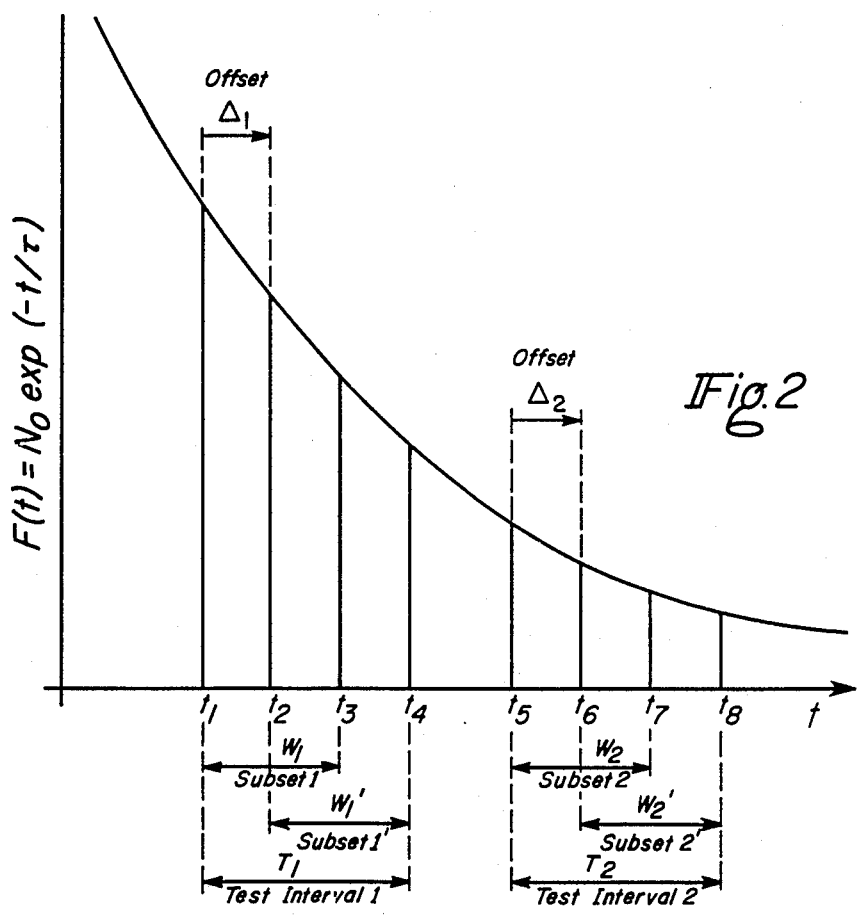
FIG. 2 is a graphical representation illustrating an ideal exponential decay curve having illustrated thereon the various measurement and test variables employed in the most preferred embodiment of the present method.
Figure 3:
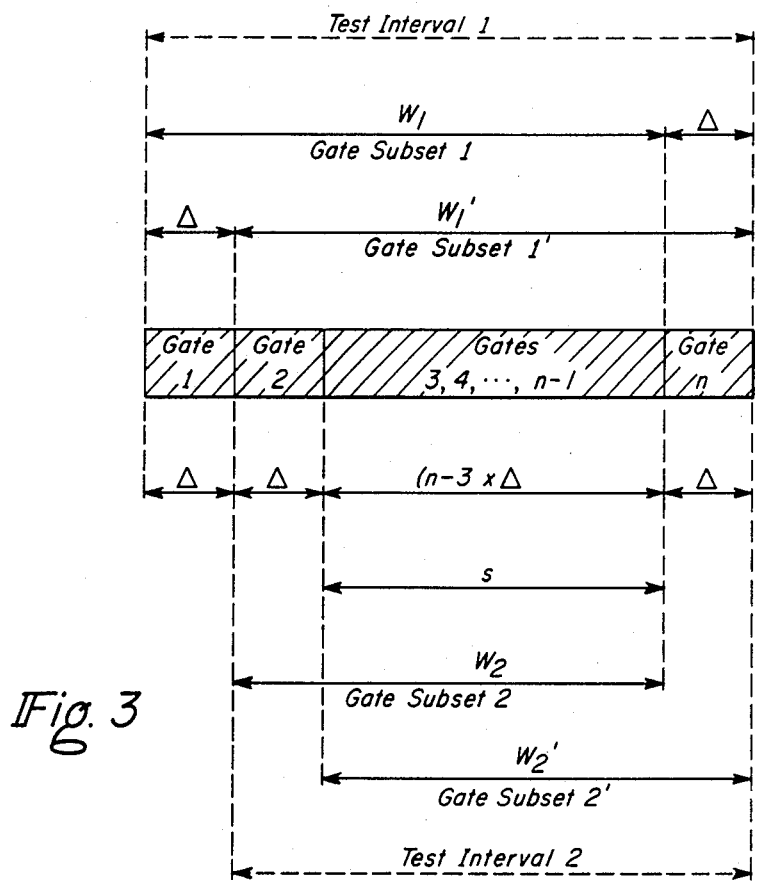
FIG. 3 is an illustration of the relationship between the various gates, windows, offsets and test intervals used in the method of the present invention.

The method of the present invention exploits mathematical properties of the integrals of exponential functions. FIGS. 2 and 3 illustrate the various terms which are used in the following description and examples. FIG. 2 is a graphical illustration of an exponential decay function whereon the various defined terms have been illustrated. FIG. 3 further illustrates the relation between these terms.

The decay of the artificially produced thermal neutron population is measured over time. Such a decay ideally produces the exponential decay function illustrated in FIG. 2. Measurements are obtained and recorded in a plurality of gates of known time width. Each gate records measurement events during a known time period, e.g., between $t_1$ and $t_2$, between $t_2$ and $t_3$ and so forth. When these gates are of equal width, as illustrated, or when the individual gate widths are integer multiples of the narrowest gate, then, the calculations of the method of the present invention are simplified. However, these gates may be of any known width. A plurality of such contiguous gates are grouped into gate subsets w. Addition of the counts in each gate subset w results in integration of the exponential decay function over the time interval w. Two such gate subsets w and w' are employed to define each test interval T. The leading edges of the gate subsets w and w' within each test interval T are separated by a time offset $\Delta$. Again, when the time widths of the subsets defining any given test interval are equal, as illustrated in FIGS. 2 and 3, later calculations are simplified. However, it is not necessary that the time widths of the subsets in any given test interval be equal. Further, it is not necessary that the time widths of subsets in different test intervals be equal. Finally, the calculations of the present invention are simplified when the offsets $\Delta$ employed in different test intervals are equal, as illustrated in FIGS. 2 and 3. However, as before, such equality is not necessary.

Integration of the exponential function of FIG. 2 is performed over $w_1$, the gate subset 1 spanning the interval from $t_1$ to $t_3$, and over $w_1'$, the gate subset 1' spanning the interval from $t_2$ to $t_4$. The two gate subsets overlap between $t_2$ and $t_3$. In general, the given time intervals could be further subdivided by narrower gates without changing the results which follow.

The integral of F(t) over gate subset 1 is given by $$I_1 = \int_{t_1}^{t_3} F(t)dt = N(0)\tau e^{-t_1/\tau}\left(1 - e^{-\frac{t_3-t_1}{\tau}}\right) \quad (3)$$

and over subset 1' by $$I_1' = \int_{t_2}^{t_4} F(t)dt = N(0)\tau e^{-t_2/\tau}\left(1 - e^{-\frac{t_4-t_2}{\tau}}\right) \quad (4)$$

A ratio $R_1$ defined as the ratio of the integrals of the time decay function over the two subsets in a test interval is given by $$R_1 = \frac{I_1}{I_1'} = e^{\Delta_1/\tau} \times \left(\frac{1 - e^{-w_1/\tau}}{1 - e^{-w_1'/\tau}}\right) \quad (5)$$

Thus, the ratio $R_1$ is generally expressed as a function of $\Delta_1$, $w_1$, $w_1'$, and $\tau$, provided the decay function being integrated is a single exponential decay function, i.e., $$R_1 = \phi_1(\Delta_1, w_1, w_1', \tau). \quad (6)$$

The timing parameters $\Delta_1$, $w_1$, and $w_1'$ are known and set to particular values in the acquisition apparatus, and the ratio $R_n$ of integrals of an exponential function may be solved for the decay constant $\tau$, i.e., $$\tau = \alpha_n(R_n, \Delta_n, w_n, w_n'). \quad (7)$$

If a different test interval is selected for the decay function of FIG. 2, with different subsets and with non-zero offset $\Delta_2$, then the ratio resulting would be given by $$R_2 = \phi_2(\Delta_2, w_2, w_2', \tau) \quad (8)$$

which can be solved for $\tau$ in the form $$\tau = \alpha_2(R_2, \Delta_2, w_2, w_2'). \quad (9)$$

Because $\tau$ is a constant for a single exponential decay function, it follows that $$\tau = \alpha_1(R_1, \Delta_1, w_1, w_1') = \alpha_2(R_2, \Delta_2, w_2, w_2') \quad (10)$$

Therefore, a functional relation involving only known variables exists between te two generalized ratios $R_1$ and $R_2$, i.e.

$$R_2 = \beta(R_1, \Delta_1, w_1, w_1', \Delta_2, w_2, w_2'). \quad (11)$$

Dependence on $\tau$ has been removed. It is required only that F(t) be a single exponential decay function over the region being tested for the preceding functional relationship between ratios to be obeyed.

Conversely, it follows that if the two ratios $R_1$ and $R_2$ do not satisfy the preceding functional requirement within a given statistical limit, then the function being examined is not a single exponential. For example, where $\sigma^2(D_{12})$ is the mean-squared standard deviation in the difference function $$D_{12} = R_2 - \beta(R_1, \Delta_1, w_1, w_1', \Delta_2, w_2, w_2') \quad (12)$$

then if the function F(t) being tested is a pure exponential, it follows from Gaussian statistics that there is a 99% probability that $D_{12}$ will be equal to zero within $3\sigma$, with only a 1% probability that $D_{12}$ will depart from zero by more than $3\sigma$. For a particular set of measured gate count accumulations characteristic of a decay function, should $D_{12}$ depart from 0 by more than $3\sigma$, then it is highly unlikely that the test intervals associated with $R_1$ and $R_2$ are spanned by a single exponential function. In order to determine whether any portion of the function is a single exponential, it is necessary to (1) establish a criterion for statistical equality and (2) find two adjacent test intervals which give rise to ratios satisfying the equality test.

Extending this procedure requires performing the ratio test on a decay function over a number of adjacent, or even overlapping, test intervals and systematically eliminating those portions of the function which fail to satisfy the required functional relationships among ratios.

Once the single exponential portion of the function has been isolated, solution for decay constant $\tau$ is achieved in any of a number of relatively simple ways. It is important that maximum use be made of available data, so that as much as possible of the data statistically compatible with a single exponential should be included and not discarded. The decay constant $\tau$ may be extracted merely by solving an integral ratio function similar to those discussed above or by other relatively simple techniques.

In an optimum application of this ratio-testing method, certain mathematical simplifications are made, providing the gate timing and gate selection scheme is properly established. As evident in the equation for the ratio $R_1$ in the preceding example, when the two gate subset time widths, $w_j$ and $w_j'$, are set equal within each test interval, then the terms involving $w_j$ and $w_j'$ cancel and are eliminated. In that case $R_1$ reduces to $$R_1(w_1=w_1')=e^{\Delta/\tau} \tag{13}$$

Furthermore, if the offsets $\Delta_1, \Delta_2, \ldots$ within a set of test intervals are also all equal so that $\Delta_1=\Delta_2=\ldots\Delta_n$, then the integral ratios $R_n$ become equal within acceptable statistical probabilities for a simple exponential decay function. The equality is exact for the mathematical integration of an exact function, but is only within statistical equality when dealing with statistical data such as nuclear radiation.

In order to minimize statistical fluctuation effects in the analyses of actual data, it is advantageous to extend the test intervals and gate subset widths to span as much as possible of the usable, single-exponential portion of the decay function. An example of an approach which includes the optimization features discussed above is shown schematically in FIG. 3. For simplicity, individual gate widths are taken as equal. The interval s represents the sum of $n-3$ contiguous equal width time gates intervening between gate 2 and gate n. Test interval 1 spans the time including all n time gates, with gate subsets 1 and 1' of equal width $w_1$, offset by one gate width $\Delta$. Test interval 2 excludes the first gate only, and includes the two gate subsets 2 and 2', which are of equal width $w_2$ and are also offset by one gate width $\Delta$.

If there is a later background sampling gate which occurs after the exponential has decayed to the constant background with count accumulation $N_B$ then, where $N_1$, $N_2$ and $N_n$ are the count accumulations in gates 1, 2 and n, and where $$S = \sum_{k=3}^{n-1} N_k \tag{14}$$

the two test ratios formed in test intervals 1 and 2 are given by $$R_1 <=> \frac{N_1 + N_2 + S - k_1 N_B}{N_2 + S + N_3 - k_1 N_B} <=> e^{\Delta/\tau} \tag{15}$$

and $$R_2 <=> \frac{N_2 + S - k_2 N_B}{S + N_3 - k_2 N_B} <=> e^{\Delta/\tau} \tag{16}$$

where $k_1$ and $k_2$ are appropriate normalization factors for background correction by subtraction, correcting for the relative time widths of the gate subsets and the background gate.

If $R_1 <=> R_2$, then the decay function being sampled by gates 1 through n is statistically compatible with a single decay function with decay constant $$\tau = \Delta/\ln R_1 \tag{17}$$

On the other hand, if it is found that $R_1 <=> R_2$, or more specifically, that $$|R_1-R_2>\rho|\sigma(R_1-R_2) \tag{18}$$

where $\rho$ is a given numerical factor, then it is concluded that the sampled decay function is unlikely to be a single exponential, with a Gaussian probability factor corresponding to the value chosen for the constant $\rho$. In a real borehole measurement, it is deduced that gate 1 contains too much borehole contribution. Accordingly, a third ratio $R_3$ is constructed which excludes both gates 1 and 2. If $R_3 <=> R_2$, then the method has been successful in determining that gates 2 through n span a single exponential function.

3. The Preferred Embodiment

The optimization techniques described above have been included in a specific preferred embodiment of the present technique, which is herein described.

The preferred method of the present invention comprises a method for accurately determining the true formation decay constant by acquiring sampling data from capture gamma radiation detectors, together with a method for testing the decay function for statistically single exponentiality and optimizing the accuracy and statistical precision of the calculated exponential decay constant by using the largest portion of sampled data consistent with an accurate measurement of geological formation properties.

Figure 4:
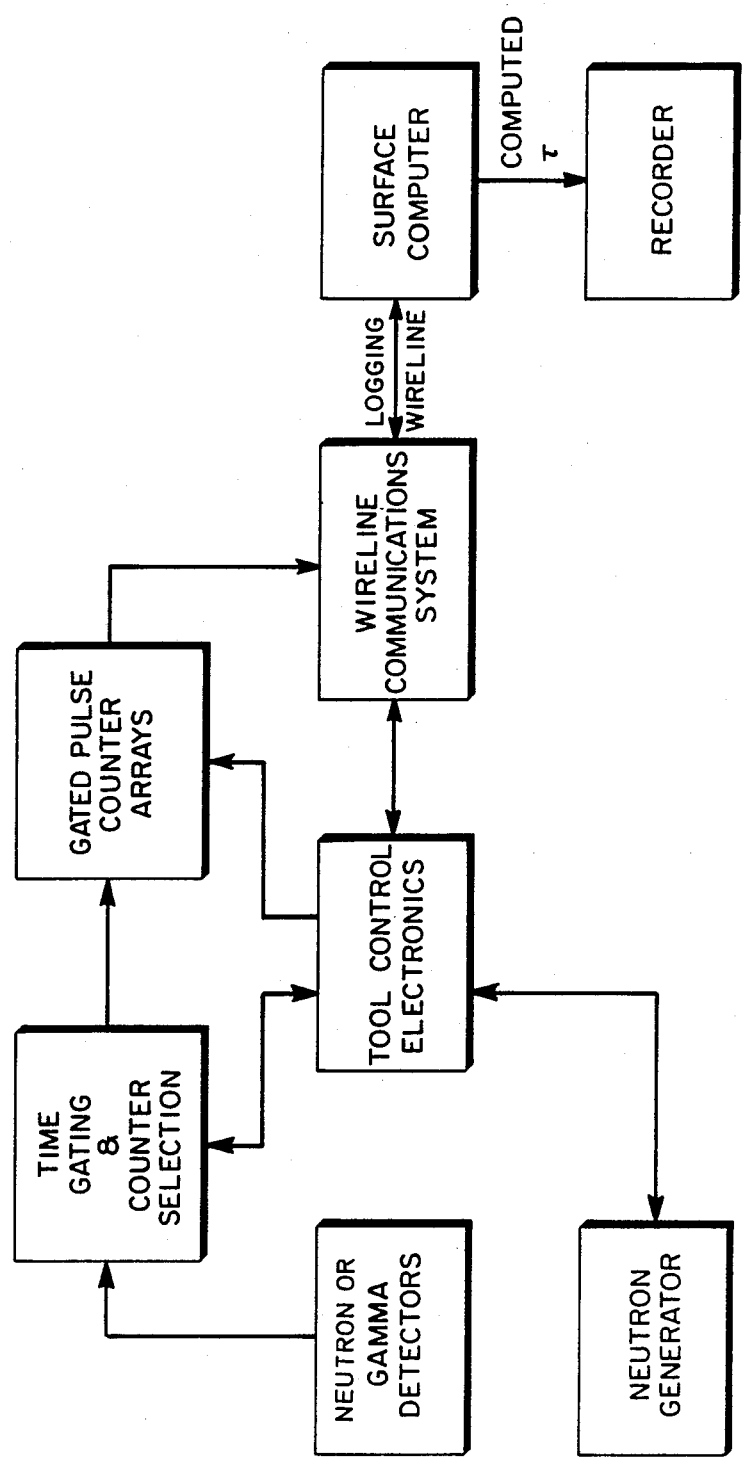
FIG. 4 is a block diagram of the data acquisition, instrumentation, communication and computational systems useful in performing the method of the present invention.

The instrumentation for data acquisition comprises a conventional downhole wireline logging instrument, including a data acquisition system and a data communications system for communicating data to a surface instrumentation system including a computational system, as illustrated in FIG. 4. The downhole tool includes an electrically powered source of pulsed neutron radiation, two scintillation gamma ray detectors and tool control electronics. The system includes a wireline communications system for communicating between the downhole tool and a surface computer and data display or readout. The tool electronics controls the operation of the neutron generator and time gating system for data accumulation from the detectors.

The neutron generator is cycled to produce bursts of radiation at regular intervals, e.g., in an exemplary method every $40 \times T_{clk}$ seconds, where $T_{clk}$ is a basic timing interval which is adjustable through signals sent from the surface instrumentation system between about 20 microseconds and about 125 microseconds. The duty cycle of the neutron generator is ten percent so that the time width of each neutron burst is $4 \times T_{clk}$. Accordingly, in the exemplary method, each neutron burst is of a duration from about 80–500 microseconds and there are about 200–1200 bursts per second.

Figure 5:
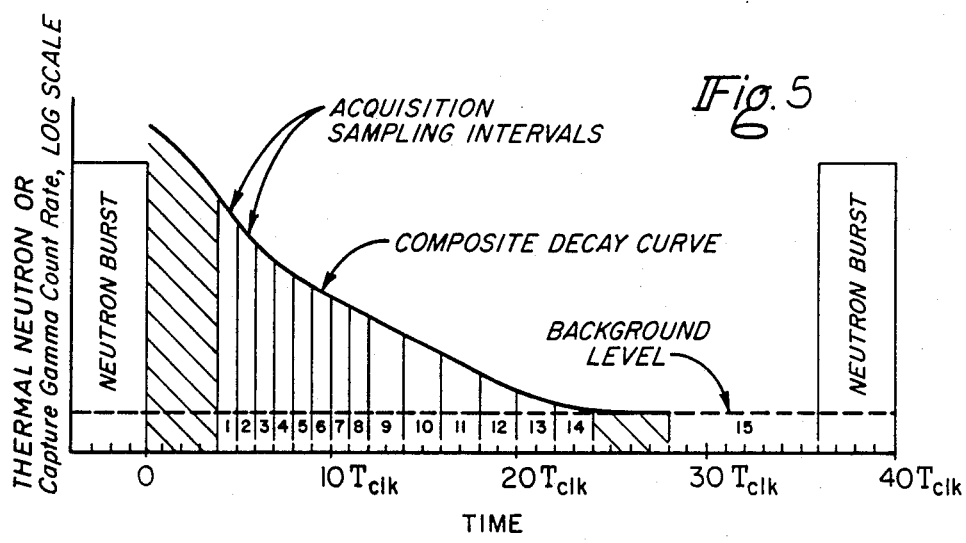
FIG. 5 is a graphical representation illustrating an actual exponential decay curve following a neutron burst and illustrating the specific gating scheme utilized in connection with the description of the preferred embodiment herein.

An exemplary gating scheme is illustrated in FIG. 5. In the illustrated embodiment, there is a total of fifteen data acquisition time gates for the purpose of sampling the formation count rate decay curve for each of the two radiation detectors. Eight contiguous early gates of equal width $T_{clk}$ span the interval from $4 \times T_{clk}$ to $12 \times T_{clk}$ after the end of each burst. These gates are numbered 1 through 8 in FIG. 5. Six more contiguous gates of equal width $2 \times T_{clk}$ span the interval from $12 \times T_{clk}$ to $24 \times T_{clk}$ after the end of the neutron burst. The gates of this second set are numbered 9 through 14. Gate number 15 spans the time interval from $28 \times T_{clk}$ to $36 \times T_{clk}$ and is used to determine the background. The neutron radiation burst occurs during the interval from $36 \times T_{clk}$ to $40 \times T_{clk}$ to complete the timing cycle.

During each gated time interval, a specific pulse counter circuit is turned on to accumulate pulses detected by one of the radiation detectors. The bank of counters continues to accumulate for a specific number of neutron burst repetition cycles, after which the total numbers contained in each of the counters 1 through 15 are transmitted to the surface computer system where they are accumulated in buffer storage registers.

After a specific total accumulation time based upon a preset logging depth interval, the total numbers of counts accumulated by the near and far detector registers are denoted by $N_{u1}, N_{u2}, \ldots N_{u15}$ and $F_{u1}, F_{u2}, \ldots F_{u15}$ for the fifteen gates of the near and far detectors, respectively. These raw, accumulated counts are corrected for detection system dead-time by means of standard dead-time compensation techniques known to those skilled in the art. The dead-time corrected count accumulations are $N_1, N_2, \ldots, N_{15}$ for the near detector and $F_1, F_2, \ldots, F_{15}$ for the far detector.

From the dead-time corrected count data, a sequence of ratios is developed. The ratios are constructed with one or more gates in the numerator and in the denominator. If more than one gate is in either the numerator or the denominator, the gates are adjacent. The total width of the gates in the numerator is equal to the total width of the gates in the denominator within each ratio, although different widths are used in different ratios. The width of the offset between the beginning of the gates in the numerator and the denominator is the same for all ratios. In this exemplary method, the ratios are constructed so that the numerator and denominator comprise data from a plurality of adjacent time gates. The numerator and denominator represent data from time intervals of equal total width and the numerator of each ratio comprises data from a time interval beginning $4 \times T_{clk}$ earlier than the time interval for the denominator. The functional definitions of ratios $R_1, R_2, \ldots, R_7$ for the exemplary embodiment are illustrated below:

$$R_1 = \frac{N_1 + N_2 + \ldots + N_{12} - 2N_{15}}{N_5 + N_6 + \ldots + N_{14} - 2N_{15}}$$

$$R_2 = \frac{N_3 + N_4 + \ldots + N_{12} - 7N_{15}/4}{N_7 + N_8 + \ldots + N_{14} - 7N_{15}/4}$$

$$R_3 = \frac{N_5 + N_6 + \ldots + N_{12} - 3N_{15}/2}{N_9 + N_{10} + \ldots + N_{14} - 3N_{15}/2}$$

$$R_4 = \frac{N_7 + N_8 + \ldots + N_{12} - 5N_{15}/4}{N_{10} + N_{11} + \ldots + N_{14} - 5N_{15}/4}$$

$$R_5 = \frac{N_9 + N_{10} + N_{11} + N_{12} - N_{15}}{N_{11} + N_{12} + N_{13} + N_{14} - N_{15}}$$

$$R_6 = \frac{N_{10} + N_{11} + N_{12} - 3N_{15}/4}{N_{12} + N_{13} + N_{14} - 3N_{15}/4}$$

$$R_7 = \frac{N_{11} + N_{12} - N_{15}/2}{N_{13} + N_{14} - N_{15}/2}$$

Gate number 15 for each of the two decoders is assumed to contain a sampling of a constant background level so that subtractive corrections may be made to each of the sets of gates in the preceding ratio formulae. For this reason, it is essential that the downhole tool clock interval $T_{clk}$ be sufficiently long to place gate 15 in the background region. If $T_{clk}$ is at least equal to $(\tau/4-10)$ microseconds, it may be assumed that excessive errors due to inaccurate background subtraction correction will be avoided. At the other extreme, the total clock period $T_{clk}$ must not be so long that the count rates have decayed excessively before being sampled, which could result in excessive statistical fluctuation in the calculated decay constant. Optimum gate placement results when the tool clock interval $T_{clk}$ is maintained approximately equal to $\tau/4$, although exact equality is not critical. In the preferred embodiment of this invention, the tool clock interval $T_{clk}$ is periodically reset to remain within 10 microseconds of the most recent value of the calculated formation decay constant divided by four.

Figure 6:
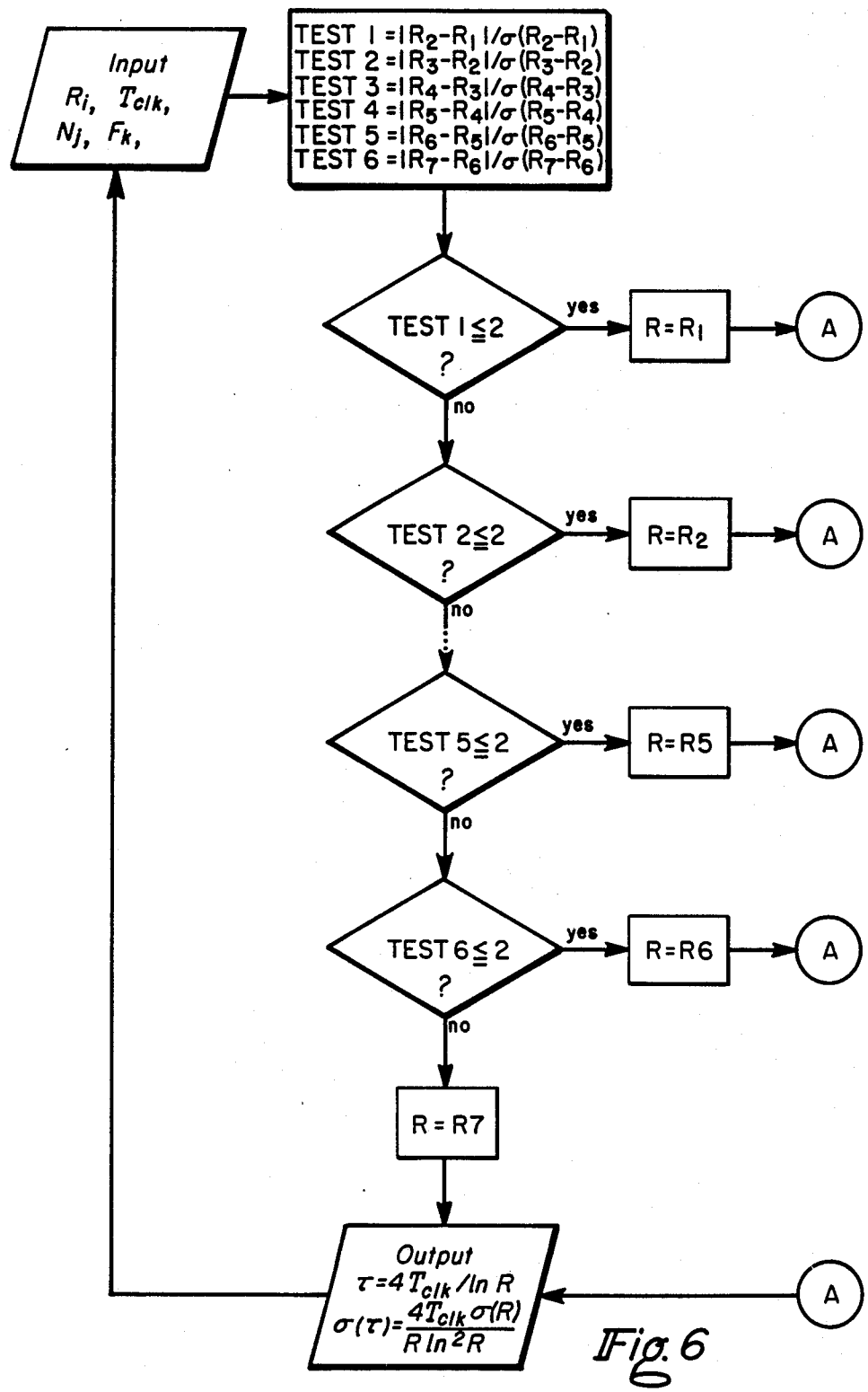
FIG. 6 is a flow chart for a ratio testing algorithm useful in performing the method of the present invention.

The seven ratios $R_1$ to $R_7$ in the exemplary embodiment are selected to eliminate progressively portions of the early sampled decay function which are $2 \times T_{clk}$ in width, beginning at a time delay $4 \times T_{clk}$ after the end of the neutron burst. A ratio testing algorithm, as illustrated in FIG. 6, progressively compares the values of adjacent ratios until two adjacent ratios are found to be equal, within a statistical criterion. The equality of two adjacent ratios, $R_j$ and $R_{j+1}$, implies that the function being sampled by the specific time intervals contained in the two ratios is a true, single exponential function. The formation decay constant is then calculated from the first ratio $R_j$ which is found to be equal to a succeeding ratio $R_{j+1}$. Using the previously explained relationship, the formation decay constant $\tau$ is determined from $R_j$, depending also upon the offset ($4 \times T_{clk}$ in the exemplary method) as follows:

$$\tau = 4 \times T_{clk}/\ln R_j$$

where $R_j$ is the first ratio statistically equal to a succeeding ratio $R_{j+1}$. In the event that no equality is found between successive ratios, the formation decay constant is estimated from the last ratio $R_7$, using only gates 11 through 15.

The ratio index j, serving as an indicator of the "goodness-of-fit" of the measured decay function to an exponential function, is recorded along with the calculated value of the decay constant. The ratio index j also serves as an indicator of the relative extent of intrusion of borehole signal contamination of the formation into the calculation of the decay function. In particular, a ratio index value $j=7$ is indicative of a non-exponential decay and a suspect $\tau$ determination. In normal applications, the probability of the worst case result with $j=7$ is very low. Any value of j less than 7 indicates the decay function has been successfully tested and found to be a single, true exponential decay, and thus that the computed value of the decay constant $\tau$ is mathematically valid and representative of the formation.

In order to have a statistically meaningful basis for testing the equalities of the seven ratios $R_1, R_2, \ldots, R_7$, the standard deviations in the differences of adjacent ratios are calculated using standard statistical procedures involving partial derivatives with respect to the independent variables $N_1, N_2, N_{15}$ and $F_1, F_2, \ldots, F_{15}$. Thus, for the near detector, the mean standard deviation in the difference of ratios $R_n$ and $R_{n+1}$ is given by:

$$\sigma(R_{n+1} - R_n) = \left[\sum_{j=1}^{15} \left|\frac{\partial(R_{n+1} - R_n)}{\partial N_j}\right|^2 \sigma^2(N_j)\right]^{\frac{1}{2}}$$

Due to the Gaussian statistical nature of nuclear processes, the standard deviations of the individual dead-time corrected counts are given by $\sigma(N_j) = (N_j)^{\frac{1}{2}}$, reducing the expressions of the preceding equation to explicit formulae which are easily calculated by the surface instrument system. A sequence of ratio equality tests is applied, with an equality criterion $|R_{n+1} - R_n| \leq 3\sigma(R_{n+1} - R_n)$. When the decay function is a true, single exponential, the ratios $R_{n+1}$ and $R_n$ will agree 99% of the time according to this criterion. Accordingly, agreement of the two ratios to within two standard deviations gives high confidence in the exponentiality of the decay function, while failure to meet the agreement criterion is a strong indication of non-exponentiality. The logical sequence of ratio tests which is utilized in the exemplary method is illustrated in the flow chart of FIG. 6.

A particular advantage of the mathematical analysis technique of the present invention is the possibility of easily extracting standard deviation values for the calculated formation decay constants using only the measured data. The standard deviation in the decay constant is calculated as follows:

$$|\sigma(\tau)| = \left|\sigma\left(\frac{4T_{clk}}{\ln R_j}\right)\right| = \left|\frac{4T_{clk}\sigma(R_j)}{R_j \ln^2 R_j}\right|$$

where $$\sigma(R_j) = \left[\sum_{i=1}^{15} \left|\frac{\partial R_j}{\partial N_i} \sigma(N_i)\right|^2\right]^{\frac{1}{2}}$$

and $$\sigma(N_i) = (N_i)^{\frac{1}{2}}.$$

The standard deviation in the decay constant $\tau$ is expressable in algebraic expressions involving only the tool clock period and the count accumulations (corrected for dead-time) in the gated counters for either the near or far detector system.

All of the tests and calculations described herein may be performed in real-time at regular depth intervals during the logging of the well. Accordingly, continuous measurement outputs for the decay constant, the standard deviation of the decay constant and the ratio index for both the near and far detector are produced. Data from each detector may be analyzed independently, including separate ratio testing and ratio index selection. Because the far detector is typically less affected by the borehole signal, independent analysis is advantageous by permitting an early ratio from the far detector to be chosen for the formation decay constant computation with better statistical precision resulting.

After separation of the formation decay function and solution for $\tau_f$, the borehole contribution may be subsequently isolated by subtraction of background and formation signal. Solution for the borehole decay constant $\tau_b$ becomes relatively straightforward, providing additional borehole diagnostic information.

The foregoing description of the invention has been directed in primary part to a particular preferred embodiment and method in accord with the requirements of the patent statutes and for purposes of explanation and illustration. It will be apparent, however, to those skilled in the art that many modifications and changes in the specifically described method may be made without departing from the scope and spirit of the invention. In fact, it is clear to those skilled in the art that the method of the present invention encompasses methods differing from the exemplary method in the number or width of the gates, the number of ratios tested, the widths of the numerators and denominators of the ratios, the specific statistical test applied and the like. Therefore, the invention is not restricted to the particular exemplary method illustrated and described, but covers all modifications which may fall within the scope of the following claims.

It is Applicants' intention in the following claims to cover such modifications and variations as fall within the true scope and spirit of the invention.

What is claimed is:

1. A method for determining a transition zone on a radiation decay curve generated in a borehole and surrounding formation, said transition zone separating a first portion of said curve dominated by effects of said borehole and a second portion of said curve dominated by effects of said surrounding formation, comprising:

irradiating said borehole and said formation with a burst of fast neutrons;

selecting at least three subsets of timed measurement gates on said decay curve resulting from said irradiation, said subsets of gates located on said decay curve between a first point defined by the end of said burst of fast neutrons and a second point defined by the commencement of the background radiation measurement;

measuring the combined concentration of thermal neutrons in said borehole and said formation during each said timed subset;

testing said decay curve for statistically single exponentiality in a succession of two test intervals, the time between said first point and the start of each successive test interval being successively greater, each said test interval including a first and a second of said subsets and defined by the earliest time of said first subset and the latest time of said second subset, said testing comprising, constructing a succession of ratios, each successive ratio associated with each successive test interval, the numerator of each said ratio constructed from the integration of said decay curve in said first subset in each said test interval and the denominator of each said ratio constructed from the integration of said decay curve in said second subset in each said test interval, comparing two successive ratios for statistical compatibility within a predetermined statistical deviation, and concluding when said statistical deviation is satisfied that the portion of said curve lying within said test intervals whose ratios are statistically compatible is a statistically single exponential; and assigning as said transition zone that portion of said decay curve lying just prior to said earliest time of said first subset in said test interval wherein said decay curve is a statistically single exponential.

2. The method of claim 1 wherein said selecting comprises dividing said decay curve into more than three contiguous said gates and selecting each said subset to comprise a plurality of said contiguous gates.

3. The method of claim 2 wherein said selecting comprises dividing said decay curve into sixteen said contiguous gates.

4. The method of claim 2 wherein said selecting comprises dividing said decay curve into more than three contiguous said gates of unequal time length.

5. The method of claim 2 wherein said selecting comprises dividing said decay curve into more than three contiguous said gates of equal time length.

6. The method of claim 5 wherein said selecting comprises selecting said first and second subsets within each test interval to be of equal time length.

7. The method of claim 6 wherein the time difference between said earliest time of said first subset and the earliest time of said second subset in each said test interval is known as the time offset, and wherein said selecting comprises selecting the time offset within each said test interval so that all said time offsets are of equal time length.

8. The method of claim 7 wherein said comparing comprises comparing said ratios for statistical equality.

9. The method of claim 1 wherein said measuring comprises detecting capture gamma rays emitted following thermal neutron capture reactions.

10. The method of claim 9 wherein said detecting comprises detecting said gamma rays with scintillation detectors.

11. The method of claim 1 wherein said irradiating and measuring steps comprise irradiating with a burst of neutrons from a fast neutron source and measuring with a gamma ray scintillation detector, and said irradiating and measuring steps are repetitively performed to increase the statistical reliance of said measured concentrations during each said timed subset.

12. The method of claim 1 wherein said measuring comprises detecting said thermal neutron concentration with neutron detectors.

13. A method for determining the thermal neutron decay time constant of a geological formation surrounding a borehole, comprising the steps of:
   irradiating said borehole and said formation with a burst of fast neutrons;
   selecting at least three subsets of gates on the decay curve resulting from said irradiation, said subsets located on said decay curve between a first point defined by the end of said burst of fast neutrons and a second point defined by the commencement of the background radiation measurement;
   measuring the combined concentration of thermal neutrons in said borehole and said formation during each said timed subset;
   testing said decay curve for statistically single exponentiality in each of at least two test intervals, the time between said first point and the start of each successive test interval being successively greater, each said test interval including a first and a second of said subsets and defined by the earliest time of said first subset and the latest time of said second subset, said testing comprising constructing a succession of ratios, each successive ratio associated with each successive test interval, the numerator of each said ratio constructed from the integration of said decay curve in said first subset in each said test interval and the denominator of each said ratio constructed from the integration of said decay curve in said second subset in each said test interval, comparing two successive ratios for statistical compatibility within a predetermined statistical deviation and, concluding when said statistical deviation is satisfied that the portion of said curve lying within said test intervals whose ratios are statistically compatible is a statistically single exponential; and
   calculating the thermal neutron decay time constant for said formation from the concentration of thermal neutrons measured in the first test interval wherein said decay curve is determined to be a statistically single exponential.

14. The method of claim 13 wherein said selecting comprises dividing said decay curve into more than three contiguous said gates and selecting each said subset to comprise a plurality of said contiguous gates.

15. The method of claim 14 wherein said selecting comprises dividing said decay curve into more than three contiguous said gates of unequal time length.

16. The method of claim 14 wherein said selecting comprises dividing said decay curve into more than three contiguous said gates of equal time length.

17. The method of claim 16 wherein said selecting comprises selecting said first and second subsets within each test interval to be of equal time length.

18. The method of claim 17 wherein the time difference between said earliest time of said first subset and the earliest time of said second subset in each said test interval is known as the time offset, and wherein said selecting comprises selecting the time offset within each said test interval so that all said time offsets are of equal time length.

19. The method of claim 18 wherein said comparing comprises comparing said ratios for statistical equality.

20. The method of claim 13 wherein said irradiating and measuring steps comprise irradiating with a burst of neutrons from a fast neutron source and measuring with a gamma ray scintillation detector, and said irradiating and measuring steps are repetitively performed to increase the statistical reliance of said measured concentrations during each said timed subset.

* * * * *